US009857985B2

(12) United States Patent
Hasegawa et al.

(10) Patent No.: US 9,857,985 B2
(45) Date of Patent: Jan. 2, 2018

(54) PROVISION OF INFORMATION ABOUT FRAGMENTATION OF FILE ON SEQUENTIAL ACCESS MEDIUM

(71) Applicant: International Business Machines Corporation, Armonk, NY (US)

(72) Inventors: Tohru Hasegawa, Tokyo (JP); Hiroshi Itagaki, Yokohama (JP); Sosuke Matsui, Tokyo (JP); Shinsuke Mitsuma, Tokyo (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 14/954,057

(22) Filed: Nov. 30, 2015

(65) Prior Publication Data

US 2017/0153823 A1 Jun. 1, 2017

(51) Int. Cl.
*G06F 3/06* (2006.01)
*G06F 17/30* (2006.01)

(52) U.S. Cl.
CPC .......... *G06F 3/0608* (2013.01); *G06F 3/0643* (2013.01); *G06F 3/0647* (2013.01); *G06F 3/0682* (2013.01); *G06F 17/30182* (2013.01)

(58) Field of Classification Search
CPC .... G06F 3/0608; G06F 3/0647; G06F 3/0643; G06F 17/30182; G06F 3/0682
USPC .......................................................... 711/112
See application file for complete search history.

(56) References Cited

U.S. PATENT DOCUMENTS

| | | | |
|---|---|---|---|
| 8,675,296 B2 | 3/2014 | Amir et al. | |
| 8,954,663 B1 * | 2/2015 | Klein .................... | G06F 3/0619 711/111 |
| 2014/0164693 A1 | 6/2014 | Hasegawa et al. | |
| 2015/0095566 A1 | 4/2015 | Itagaki et al. | |
| 2016/0342481 A1 * | 11/2016 | Nanivadekar ..... | G06F 17/30073 |

OTHER PUBLICATIONS

Gharaibeh, Abdullah et al., "DedupT: Deduplication for Tape Systems", IEEE, 2014 30th Symposium on Mass Storage Systems and Technologies MSST), Santa Clara, CA, Jun. 2-6, 2014, 11 pages.

* cited by examiner

*Primary Examiner* — Jasmine Song
(74) *Attorney, Agent, or Firm* — Francis Lammes; Stephen J. Walder, Jr.; Randall J. Bluestone

(57) ABSTRACT

A mechanism is provided for providing information about fragmentation of a file on a sequential access medium by a computer system is disclosed. An actual time for reading the file recorded on the sequential access medium is estimated based on a physical position of the file. A total length of the file on the sequential access medium is calculated based on a physical length of each data piece constituting the file. An expected time for reading the file by assuming that the file is rewritten continuously is estimated based on the total length of the file. Information about the fragmentation of the file is then provided based on the actual time and the expected time.

20 Claims, 11 Drawing Sheets

```
<file>
<name>1111111111111111111-1111111111111111111-
1111111111-11111-1</name>
<length>185504</length>
<readonly>false</readonly>
<creationtime>20xx-xx-xxT06:45:19.429887274Z</creationtime>
<changetime>20xx-xx-xxT06:52:02.309109393Z</changetime>
<modifytime>20xx-xx-xxT06:52:02.246644691Z</modifytime>
<accesstime>20xx-xx-xxT06:45:19.429887274Z</accesstime>
<backuptime>20xx-xx-xxT06:45:19.429887274Z</backuptime>
<fileuid>7</fileuid>
<extendedattributes>
<xattr>
<key>xxx.yyyy.zzzz.path</key>
<value>/xxx/zzzz0/zzzz.docs-1.1.1-11.aaaaa.bbb</value>
</xattr>
</extendedattributes>
<extentinfo>
<extent>
<fileoffset>0</fileoffset>
<partition>b</partition>
<startblock>39</startblock>
<byteoffset>0</byteoffset>
<bytecount>185504</bytecount>
<startwrap>5</startwrap>
<startlpos>295332</startlpos>
<endwrap>5</endwrap>
<endlpos>393734</endlpos>
</extent>
</extentinfo>
</file>
```

EXTENT

PHYSICAL POSITION OF DATA EXTENT

FIG. 5

```
<file>
<name>111111111111111111-11111111111111111111-
1111111111-11111-1</name>
<length>185504</length>
<readonly>false</readonly>
<creationtime>20xx-xx-xxT06:45:19.429887274Z</creationtime>
<changetime>20xx-xx-xxT06:52:02.309109393Z</changetime>
<modifytime>20xx-xx-xxT06:52:02.246644691Z</modifytime>
<accesstime>20xx-xx-xxT06:45:19.429887274Z</accesstime>
<backuptime>20xx-xx-xxT06:45:19.429887274Z</backuptime>
<fileuid>7</fileuid>
<extendedattributes>
<xattr>
<key>xxx.yyyy.zzzz.path</key>
<value>/xxx/zzzz0/zzzz.docs-1.1.1-11.aaaaa.bbb</value>
</xattr>
<xattr>
<key> fragmentationrate</key>      } FRAGMENT INFORMATION
<value>0.7561</value>
</xattr>
</extendedattributes>
<extentinfo>
<extent>
<fileoffset>0</fileoffset>
<partition>b</partition>
<startblock>39</startblock>
<byteoffset>0</byteoffset>
<bytecount>185504</bytecount>
<startwrap>5</startwrap>
<startlpos>295332</startlpos>
<endwrap>5</endwrap>
<endlpos>393734</endlpos>
</extent>
</extentinfo>
</file>
```

FIG. 11

PROVISION OF INFORMATION ABOUT FRAGMENTATION OF FILE ON SEQUENTIAL ACCESS MEDIUM

BACKGROUND

The present invention, generally, relates to sequential access media, more particularly, to provision of information about fragmentation of files on sequential access media.

A linear tape file system (LTFS) is software that allows for performing standard file operations to tape media and providing intuitive interface to users to manipulate files or directories on the tape media. Technical development of the LTFS format specification is now continued in SNIA (Storage Networking Industry Association) TWG (Technical Work Group).

Several implementations of the LTFS have been developed for tape drives and tape libraries. Hierarchical storage systems integrating with the LTFS, in which part of files is stored on tape media in the LTFS format, have been also developed.

Although the LTFS can present the tape media as disk like drives, the tape medium may not allow for random access since the tape medium is sequential in nature. Data for a signal file may be fragmented over the tape medium when partially updated data of the file is appended after other file, or the file is written together with other file. Since tape drives may take some time to locate start position of each fragment, read time for the fragmented file may prolong in comparison with a file recorded continuously on the tape medium, resulting in read performance degradation.

The read performance of such fragmented file can be improved by rewriting the file. However, degree of improvement by rewriting the file may depend on how the file is scattered over the tape medium. Regardless, there is lack of information about how the file is scattered over the tape medium as well as how much the read performance can be improved by rewriting the file. Standard application programming interfaces such as POSIX (Portable Operating System Interface) API do not provide any information about fragmentation of files and any suggestion about read performance improvement by rewriting.

SUMMARY

According to an embodiment of the present invention, there is provided a method for providing information about fragmentation of a file on a sequential access medium by a computer system. The method comprises estimating an actual time for reading the file recorded on the sequential access medium based on a physical position of the file. The method also comprises calculating a total length of the file on the sequential access medium based on a physical length of each data piece constituting the file. The method further comprises estimating an expected time for reading the file by assuming that the file is rewritten continuously, based on the total length of the file. The method further comprises providing information about the fragmentation of the file based on the actual time and the expected time.

According to another embodiment of the present invention, there is provided a computer system for providing information about fragmentation of a file on a sequential access medium. The computer system comprises an actual time estimator configured to estimate an actual time for reading the file recorded on the sequential access medium based on a physical position of the file. The computer system also comprises a file length calculator configured to calculate a total length of the file on the sequential access medium based on a physical length of each data piece constituting the file. The computer system also comprises an expected time estimator configured to estimate an expected time for reading the file by assuming that the file is rewritten continuously, based on the total length of the file. The computer system further comprises a file information provider configured to provide information about the fragmentation of the file based on the actual time and the expected time.

According to a further embodiment of the present invention, there is provided a computer program product for providing information about fragmentation of a file on a sequential access medium. The computer program product comprises a computer readable storage medium having program instructions embodied therewith, in which the computer readable storage medium is not a transitory signal per se. The program instructions comprise computer-executable program code to estimate an actual time for reading the file recorded on the sequential access medium based on a physical position of the file. The program instructions also comprise computer-executable program code to calculate a total length of the file on the sequential access medium based on a physical length of each data piece constituting the file. The program instructions further comprise computer-executable program code to estimate an expected time for reading the file by assuming that the file is rewritten continuously, based on the total length of the file. The program instructions further comprise computer-executable program code to provide information about the fragmentation of the file based on the actual time and the expected time.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIG. 5 shows an example of data structure of index data for a file, which includes information about physical positions of the file;

FIG. 11 shows the data structure of index data for a file, which includes information about fragmentation of the file on the tape medium.

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to methods, computer systems and computer program products for providing information about fragmentation of a file on a sequential access medium.

Now, referring to the series of FIGS. 1-11, there are shown tape storage management systems and methods for providing information about fragmentation of a file on a tape medium, which is one of sequential access media, according to one or more exemplary embodiments of the present invention.

Figure 1A:
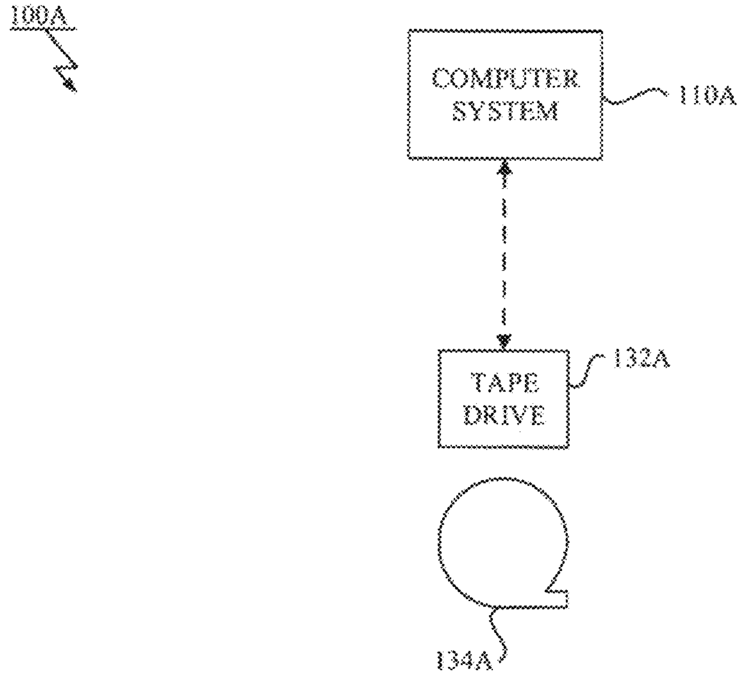
FIGS. 1A and 1B show overviews of tape storage management systems according to one or more exemplary embodiments of the present invention.
Figure 1B:
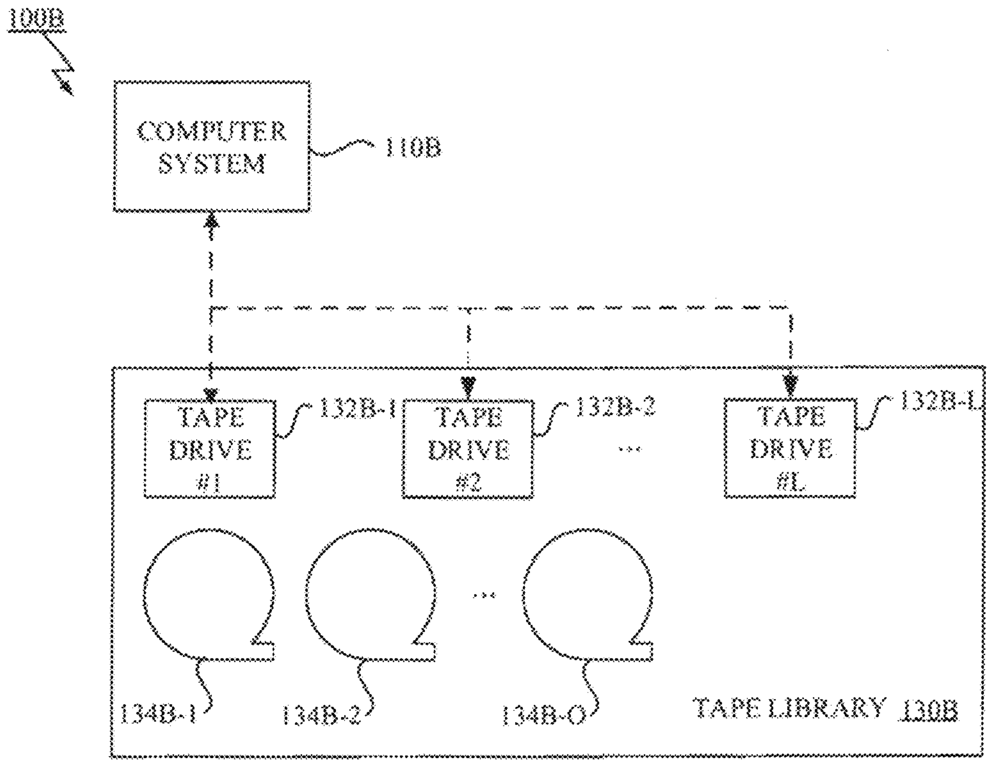

FIGS. 1A and 1B show overviews of tape storage management systems according to one or more exemplary embodiments of the present invention. FIG. 1A shows a tape storage management system 100A using a single tape drive 132A. FIG. 1B shows a tape storage management system 100B using a tape library 130B that includes one or more tape drives 132B-1~132B-L.

The tape storage management system 100A shown in FIG. 1A includes a computer system 110A and a tape drive 132A connected to the computer system 110A. The computer system 110A may be connected to the tape drive 132A via SAN (Storage Area Network) fabric, FC (Fibre Connection) LVD (Low Voltage Differential) SCSI (Small Computer System Interface) or SAS (Serial Attached SCSI) cables.

The tape drive 132A accepts a tape medium 134A and the tape medium 134A may be inserted into the tape drive 132A. The tape media 134B-1~134B-O may be preferably any one of LTO (Linear Tape-Open) Ultrium 5 or later tape cartridges, which support LTFS. The computer system 110A implements a tape file system such as LTFS (Linear Tape File System) in order to access data on the tape medium 134A through the tape drive 132A.

The tape storage management system 100B shown in FIG. 1B includes a computer system 110B and a tape library 130B connected to the computer system 110B. The computer system 110B may be connected to the tape library 130B via SAN fabric, FC LVD SCSI or SAS cables. The tape library 130B includes one or more tape drives 132B-1~132B-L and a number of slots to hold tape media 134B-1~134B-O. Equipping the plurality of the tape drives 132B-1~132B-L enables the computer system 110B to access a set of the tape media 134B-1~134B-O simultaneously.

The tape library 130B may further include an automated mechanism such as a robotic mechanism for loading the tape media 134B-1~134B-O to the tape drives 132B-1~132B-L. A desired tape medium 134B# may be selected from among the one or more tape media 134B-1~134B-O and inserted into the a selected tape drive 132# from among tape drives 132B-1~132B-L by the robotic mechanism. The computer system 110B implements a tape file system such as the LTFS in order to access data on the tape media 134B-1~134B-O through the tape drives 132B-1~132B-L in the tape library 130B.

By referring to FIGS. 1A and 1B, the particular embodiments of the tape storage management system are shown. However, the tape storage management systems 100A and 100B shown in FIGS. 1A and 1B, hereinafter referred collectively as tape storage management system 100, are only examples for typical tape storage management systems and are not intended to suggest any limitation. The techniques of one or more embodiments according to the present invention, which will be described later, can be implemented in a variety of configurations, which includes any one of the configurations shown in FIGS. 1A and 1B and one or more variant configurations. Also note that the tape media 134A and 134B-1~134B-O, hereinafter referred collectively as tape medium 134, is only an example of possible sequential access medium to which the technique of one or more embodiments according to the present invention can be applicable. In other embodiments, any known sequential access medium may be used in place of or in addition to the tape medium.

Also note that the tape storage management system 100A shown in FIG. 1A may correspond to an LTFS (Liner Tape File System) configuration for a single tape drive. The tape storage management system 100B shown in FIG. 1B may correspond to an LTFS configuration for a tape library. Furthermore, the techniques of one or more embodiments according to the present invention can be implemented as a tape storage management module in a hierarchical storage system, in which a tape file system is integrated with a clustered file system or distributed parallel file system on one or more computer systems.

Figure 2:
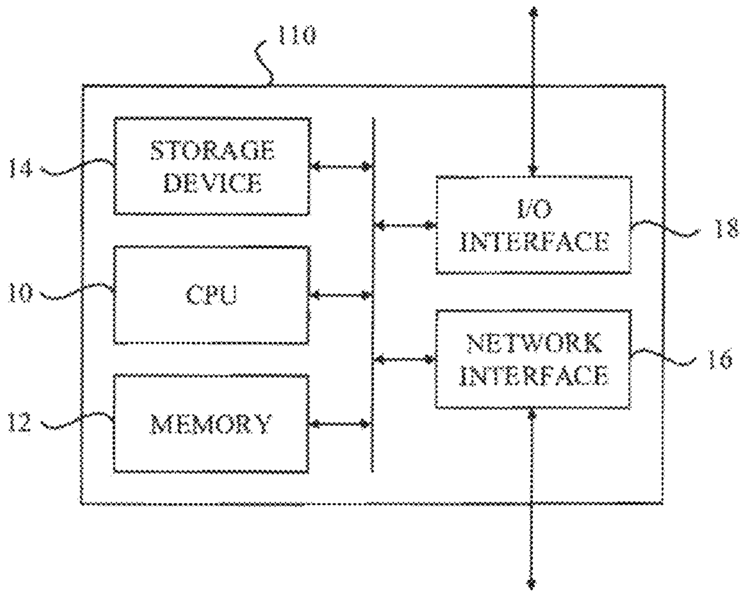
FIG. 2 depicts a schematic of a computer system implementing the tape storage management system according to an exemplary embodiment of the present invention.

Referring now to FIG. 2, a schematic of an example of a computer system is shown. The computer system 110 is only one example of a suitable computer system and is not intended to suggest any limitation as to the scope of use or functionality of embodiments of the invention described herein. Regardless, the computer system 110 is capable of being implemented and/or performing any of the functionality set forth herein.

The computer system 110 is operational with numerous other general purpose or special purpose computing system environments or configurations. Examples of well-known computing systems, environments, and/or configurations that may be suitable for use with the computer system 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 110 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 2, the computer system 110 is shown in the form of a general-purpose computing device. The components of the computer system 110 may include, but are not limited to, one or more central processing units (CPU or processors) 10 and a memory 12 operatively coupled to the processors 10 by a bus including a memory bus or memory controller, and a processor or local bus using any of a variety of bus architectures.

The computer system 110 typically includes a variety of computer system readable media. Such media may be any available media that is accessible by the computer system 110, and it includes both volatile and non-volatile media, removable and non-removable media.

The memory 12 can include computer system readable media in the form of volatile memory, such as random access memory (RAM). The computer system 110 may further include other removable/non-removable, volatile/non-volatile computer system storage media. By way of example only, the storage device 14 can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, the storage device 14 may include at least one program product having a set (e.g., at least one) of program modules that are configured to carry out the functions of embodiments of the invention.

Program/utility, having a set (at least one) of program modules, may be stored in the storage device 14 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 110 may also communicate with one or more peripherals such as a keyboard, a pointing device, etc.; a display; one or more devices that enable a user to interact with the computer system 110; and/or any devices (e.g., network card, modem, etc.) that enable the computer system 110 to communicate with one or more other computing devices via a SAN fabric. Such communication can occur via Input/Output (I/O) interfaces 18. Still yet, the computer system 110 can communicate with one or more networks such as a local area network (LAN), a general wide area network (WAN), and/or a public network (e.g., the Internet) via the network interface 16. As depicted, the network interface 16 communicates with the other components of the computer system 110 via bus. It should be understood that although not shown, other hardware and/or software components could be used in conjunction with the computer system 110. Examples include, but are not limited to: microcode, device drivers, redundant processing units, external disk drive arrays, RAID systems, tape drives, and data archival storage systems, etc.

Hardware and/or software components of the tape library 130B and the tape drives 132-1~132B-L may include, similar to the computer system 110 shown in FIG. 2, a processor, a memory, a read only memory, a network adopter, and a I/O interface, tape drive mechanism, robot mechanism, and other appropriate components, but not be shown in the drawings any more.

Figure 3A:
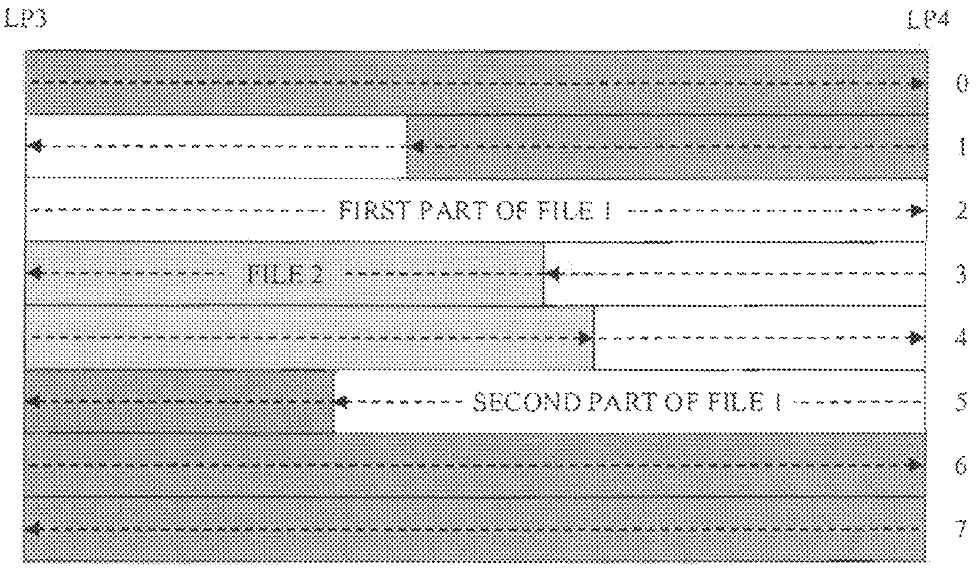
FIG. 3A depicts data arrangement and fragmentation of a file on a tape medium in accordance with LTFS format.

Referring to FIG. 3A, data arrangement and fragmentation of a file on a tape medium in accordance with LTFS format are described. The tape medium has a partition with a number of wraps, each of which is a set of tracks in a single one-way pass between logical points that indicate a beginning and an end of a wrap (from LP3 to LP4 or from LP4 to LP3). For example, an LTO-5 tape medium may have 80 wraps (20 wraps per band×4 bands) and an LTO-6 tape medium may have 136 wraps (34 wraps per band×4 bands).

The LP3 and LP4 represent a beginning and an end of a user data region in a data storage area in a longitudinal direction of the tape medium, respectively. The beginning of the wrap corresponds to LP3 for forward wraps and LP4 for reverse wraps. The end of the wrap corresponds to LP4 for forward wraps and LP3 for reverse wraps. Note that wraps are described to be written from top to bottom for convenience and simplicity. However, in a particular embodiment, the wraps may be arranged in bidirectional serpentine layout.

In the LTFS, writing operations may proceed by making a pass over the tape medium in forward and backward repeatedly. In particular, recording physical position of the data on the tape medium is represented by a position in the longitudinal direction of the tape medium (hereinafter, this position may be referred as "LPOS") and a position in a lateral direction perpendicular to the longitudinal direction (hereinafter, this position may be referred as "WRAP").

Although the tape drive 132A and/or tape drives 132-1~132B-L may perform writing and reading operations based on the LPOS and the WRAP, however, the LTFS software may designate a logical block number instead of the LPOS and the WRAP to write/read data to/from the tape medium. Generally, the LTFS software is not aware of the specific LPOS and WRAP where the data is written on the tape medium.

Storing files on the tape medium using the LTFS, data for a signal file is often fragmented on the tape medium. As shown in FIG. 3A, one part of the file (e.g. the second part of the file 1 in FIG. 3A) is appended to the tape medium just after other file (e.g. the file 2 in FIG. 3A) separately from the other part of the file (e.g. the first part of the file 1 in FIG. 3A). In the describing embodiment, the terms "fragmentation" and "fragment" describe a situation where data pieces constituting a single file are recorded on a tape medium separately, each of which resides at different locations on the tape medium.

Such fragmentation of files may occur due to the following reasons: (1) A file on a tape medium is partially updated and merely updated part is appended after other data already written on the tape medium: and (2) multiple files are simultaneously written onto the tape medium.

Since the tape drive may take some time to locate start position of each data piece, a time required for reading the fragmented file may prolong in comparison with a file recorded continuously, on the tape medium. In order to improve the read performance of the file, the fragmented file can be rewritten by reading all of the data pieces constituting the file and writing entire of the file back to the tape medium continuously. However, degree of improvement by rewriting the file may depend on how the file is scattered over the tape medium.

Hence, to eliminate fragmentations on the tape medium, users need to find a file whose reading time is longer than those of the other files having almost same size from among all files on the tape medium, and rewrite the file that is suspected to be fragmented. Since the reading time may vary due to various reasons, accordingly, read performance of the suspected file may not be improved even though the reading time of the suspected file is found to be longer than those expected. Thus, considerably long time and large workload may be required to eliminate the fragmentations of all of the files on the tape medium. Since new data is always appended to the tape medium, rewriting of the file takes twice of its original usage even though merely rearrangement of the same data is actually done.

Regardless, there is lack of information about how the file is scattered over the tape medium and how much the read performance can be improved by rewriting. Standard application programming interfaces such as POSIX API do not provide any information about fragmentation of files and any suggestion of read performance improvement by rewriting. Therefore, there are needed methods, computer systems and computer program products capable of providing information about fragmentation of a file on a tape medium, which suggests expectation of read performance improvement by rewriting the file.

In one or more embodiments according to the present invention, a novel file information provision function for providing information about fragmentation of a file on a tape medium is incorporated into the tape storage management system 100. The computer system 110 estimates an actual read time required for reading the file recorded on the tape medium 134 after locating a start position of the file based on a physical position of the file. The physical position of the file may include a physical position of each data piece that constitutes the file. The physical position of each data piece may include a longitudinal position (LPOS) and a wrap position (WRAP) of start and end positions.

The computer system 110 further calculates a total length of the file on the tape medium 134 based on a physical length of each data piece. The total length may be a length of the file virtually rearranged in a straight line by unfolding wraps of the file and closing spaces between the data pieces on the tape medium 134. Then, the computer system 110 estimates an expected read time required for reading the file after locating an expected start position of the file by assuming that the file is rewritten continuously, based on the total length of the file. Finally, the computer system 110 provides information about the fragmentation of the file based on the actual and expected read times estimated.

Since difference between the actual and expected read times indicates how the file is scattered over the tape medium, the novel file information provision function according to one or more embodiments of the present invention can provide information about fragmentation of the file on the tape medium, which may suggest expectation of read performance improvement by rewriting the file. It can assist users to select an appropriate file whose read performance is expected to be improved by rewriting.

Now, referring to the series of FIGS. 4-11, it will be described the novel file information provision function for providing information about fragmentation of the file on the tape medium in more detail.

Figure 4:
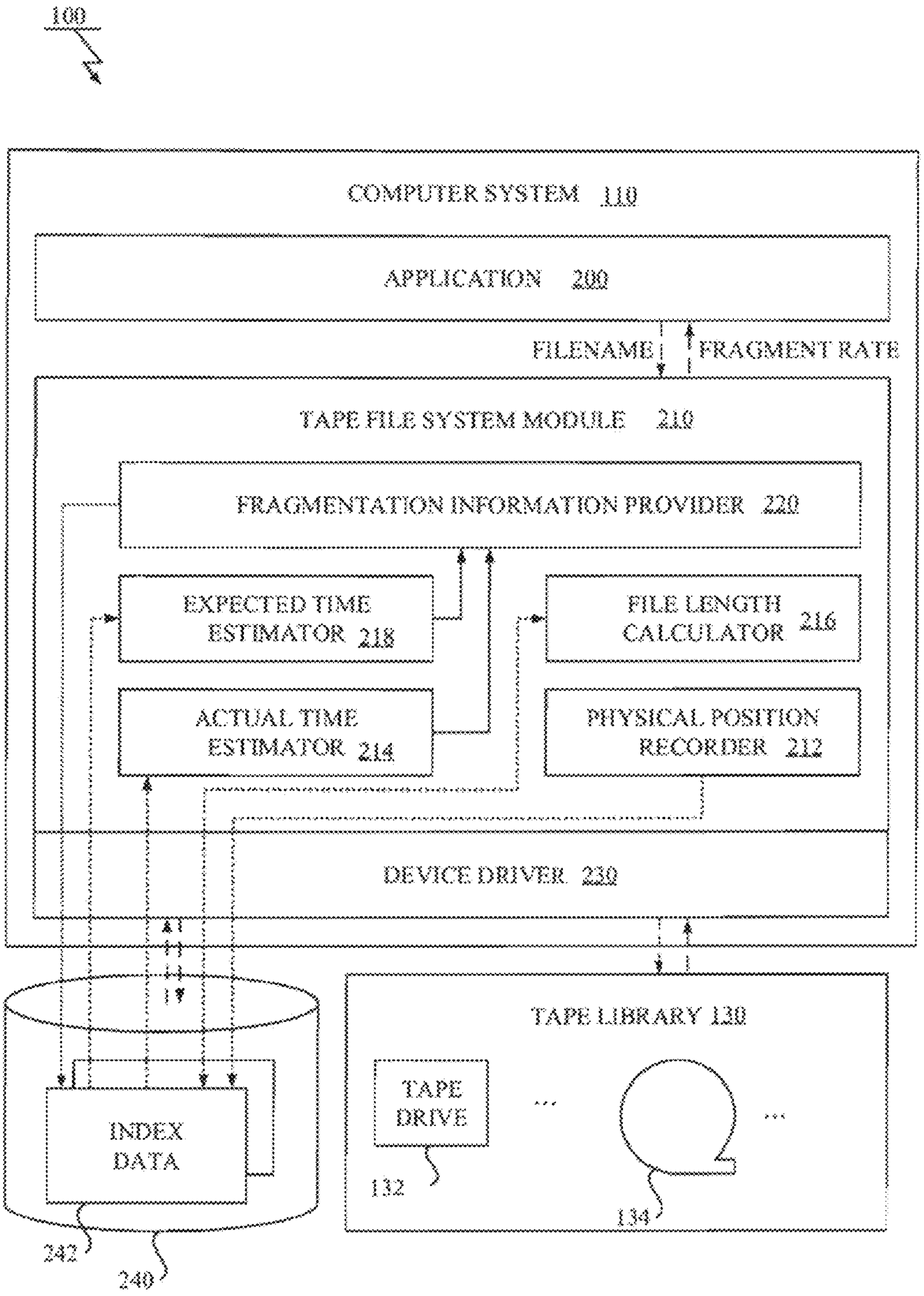
FIG. 4 illustrates a block diagram of a tape storage management system according to an exemplary embodiment of the present invention.

Referring now to FIG. 4, a block diagram of the tape storage management system 100 is illustrated. The tape storage management system 100 shown in FIG. 4 may correspond to the system shown in FIG. 1B. As shown in FIG. 4, the tape storage management system 100 includes the computer system 110 connected to the tape library 130. The computer system 110 may include an application 200, a tape file system module 210 and a device driver 230.

The application 200 runs on an operating system (OS) such as a Linux® OS, a Windows® OS, or a Mac® OS for requesting to obtain file attributes from the tape file system module 210. The application 200 may be any application that requests to obtain the file attribute.

The tape medium 134 includes one or more files and an index data written in a format that the tape file system module 210 can manage. In accordance with the LTFS specification, the tape medium 134 may include an index partition and a data partition. The index partition contains index data such as information associated with allocation of files. The data partition contains all of content data and the index data. The application 200 may request to access files on the tape medium 134.

The tape file system module 210 may be a software component that allows for performing file operations to the tape medium 134 and providing interface to manipulate files on the tape medium 134 in the tape library 130. The tape file system module 210 accesses recording space on the tape medium 134 through their file system interface and handles data as file objects and associated metadata. The tape library 130 is mounted entirely as a file system, and the tape medium 134 in the tape library 130 may be accessed as subdirectories under a mount point of the tape library 130.

The device driver 230 allows for accessing the files and the index data on the tape medium 134. The index data may be read from the index partition of the tape medium 134 to a cache 240 at the time of mounting of the tape medium 134. The latest index data 242 stored in the cache 240 may be written back to the index partition of the tape medium 134 at the time of unmounting of the tape medium 134. Thus, an instruction to write or read a file to/from the tape medium 134 is output from the application 200 to the tape drive 132 via the tape file system module 210 and the device driver 230. Note that the cache 240 may be an appropriate storage device such as a disk device or a memory device.

Referring further to FIG. 4, more detailed configuration of the tape file system module 210 is illustrated. As shown in FIG. 4, the tape file system module 210 includes a physical position recorder 212, an actual time estimator 214, a file length calculator 216, an expected time estimator 218 and a fragmentation information provider 220.

The physical position recorder 212 is configured to obtain current LPOS and WRAP from the tape drive 132 at the beginning and the end of writing data, and update the index data 242 stored in the cache 240 such that the LPOS and WRAP of the start and end positions of the data is written as an attribute of the file. In a particular embodiment, the LPOS and the WRAP representing a current position of a tape head on the tape medium 134 can be obtained from sense data or mode page data indicating an operating state of the tape drive 132 by using a SCSI command. The sense data and the mode page data may include positional information on the tape head, from which the WRAP and the LPOS of the tape head can be obtained.

Figure 3B:
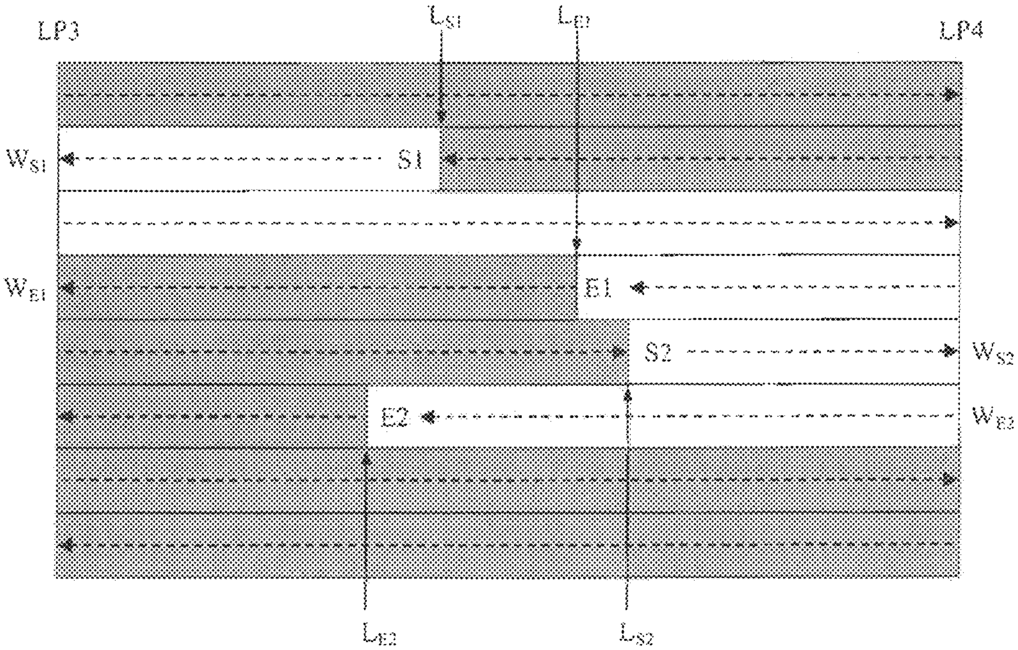
FIG. 3B depicts physical positions of a fragmented file on the tape medium.

Referring to FIG. 3B, physical positions about a fragmented file on the tape medium is depicted. In FIG. 3B, a white region represents a data piece of the fragmented file and a gray region represents other data or space region. As shown in FIG. 3B, the file is fragmented into two data pieces. In LTFS, data pieces that constitute a file are called as "data extents". In FIG. 3B, first data extent is recorded from position S1 to position E1 on the tape medium, and after another data is recorded, second data extent is recorded from position S2 to position E2. Specifically, the first data extent is recorded from the position $L_{S1}$ to the LP3 in the start wrap $W_{S1}$, from the LP3 to the LP4 in the next wrap $W_{S1}+1$, and from the LP4 to the position $L_{E1}$ in the further next wrap $W_{S1}+2$, which corresponds to the end wrap $W_{E1}$. After another data is recorded, the second data extent is recorded from the position $L_{S2}$ to the LP4 in the start wrap $W_{S2}$ and from the LP4 to the position $L_{E2}$ in the end wrap $W_{E2}$.

The physical position recorder 212 obtains information of the positions S1 or S2 ($W_{S1}$ and $L_{S1}$ or $W_{S2}$ and $L_{S2}$) at the beginning of writing the first data extent or the second data extent. Also, the physical position recorder 212 obtains information of the positions E1 or E2 ($W_{E1}$ and $L_{E1}$ or $W_{E2}$ and $L_{E2}$) at the end of writing the first data extent or the second data extent.

Referring to FIG. 5, an example of data structure of index data for a file is shown. The tape file system module 210 may create an extent in the index data when recording the data. In FIG. 5, the part expressed in boldface is the created extent, of which the underlined part is the information about the physical positions of the data extent.

The information written to the extent includes an offset of a data extent within a file (fileoffset), a block number at which recording of the data extent is started (startblock), the byte count (bytecount), a start position (startwrap, startlpos) and an end position (endwrap, endlpos) of the data extent. The elements “startwrap”, “startlpos”, “endwrap” and “endlpos” correspond to $W_{Sn}$, $L_{Sn}$, $W_{En}$, and $L_{En}$ shown in FIG. 3B, respectively.

In a describing embodiment, the physical position recorder 212 may further be configured to obtain current LPOS and WRAP from the tape drive 132 at the end of writing data or metadata and stores the LPOS and WRAP as a physical position of EOD into the index data 242 stored in the cache 240. As a way compatible with the LTFS format specification, the WRAP and the LPOS of the EOD can be stored as an extended attribute of a root directory.

Referring back to FIG. 4, the actual time estimator 214 is configured to estimate an actual read time required for reading the file recorded on the tape medium 134 based on the physical position of the file.

The time required for reading the file depends on how the file is recorded on the tape medium. In a particular implementation, the tape drive 132 may support a function for compressing data. In this case, even though files with the same file size are stored in the tape medium 134, physically occupied area on the tape medium may vary depending on whether or not the files can be compressed well. Thus, the time required for reading a file may differ from each other even though the files have the same size.

As described above, the physical position of the file, which includes the physical position of the data extents, can be obtained from the extended attribute of the file. The actual time estimator 214 is configured to calculate the actual read time based on the WRAP and the LPOS stored in the extent. In a particular embodiment, the actual read time (actualReadTime) of the file can be calculated by using the following equation:

$$actualReadTime = \sum_{n=0}^{N} \sum_{W=W_{Sn}}^{W_{En}-1} T_{WC}(W \to W+1) +$$

$$\sum_{n=0}^{N} f(W_{En}, W_{Sn}) \times (W_{En} - W_{Sn} - 1) \times (lp4 - lp3)/S_R +$$

$$\sum_{n=0}^{N} g(W_{En}, W_{Sn}) \times (|L_{Sn} - l(W_{Sn})| + |L_{En} - l(W_{En}+1)|)/S_R +$$

-continued $$\sum_{n=0}^{N} (1 - g(W_{En}, W_{Sn})) \times |L_{En} - L_{Sn}|/S_R +$$

$$\sum_{n=0}^{N-1} (T_{WC}(W_{En} \to W_{Sn+1})) + |L_{En} - L_{Sn+1}|/S_L$$

where:

$S_L$: SPEED TO LOCATE $(LOPS/s)$ $S_R$: SPEED TO READ $(LOPS/s)$ $T_{WC}(W_p \to W_q)$: TIME FOR WRAP CHANGE FROM $W_p$ TO $W_q$ $N$: END OF EXTENT NUMBER $$f(W_{En}, W_{Sn}) = \begin{cases} 1 & \text{if } (W_{En} - W_{Sn}) > 1 \\ 0 & \text{else} \end{cases}$$

$$g(W_{En}, W_{Sn}) = \begin{cases} 0 & \text{if } (W_{En} = W_{Sn}) \\ 1 & \text{else} \end{cases}$$

$$l(W) = \begin{cases} lp3 & \text{if } (W = \text{odd wrap}) \\ lp4 & \text{else} \end{cases}$$

In this equation, $lp^3$ and $lp^4$ represent the longitudinal position (LPOS) of LP3 and LP4, respectively, which is depended on the types of the tape drive and tape medium used; $S_R$(LPOS/s) is reading speed; $S_L$(LPOS/s) is moving speed during seeking; $T_{WC}$(Wp→Wq) is a function that gives a time required to move from the wrap $W_p$ to the wrap $W_q$; l(W) is a function that gives a longitudinal position (LPOS) of the end or the beginning of the data within the wrap W; f($W_{En}$, $W_{Sn}$) is a function which returns 1 if the difference between $W_{En}$ and $W_{Sn}$ is greater than 1, and otherwise returns 0; and g($W_{En}$, $W_{Sn}$) is a function which returns 0 if $W_{En}$ equals to $W_{Sn}$, and otherwise returns 1; N represents end of extent number assigned to the last data extent.

In above mentioned equation, the first term gives a time required for changing wraps during reading. The second term gives a time required for reading data from the beginning to the end of wraps fully occupied by the data. The third term gives a time required for reading remaining data having a length of less than one wrap from the beginning or to the end of corresponding wraps. The fourth term gives a time required for reading data extent from the start position to the end position if the data extent does not reside over the plurality of wraps. If the file consists of the plurality of the data extents, every term may be summed up for all data extents. The fifth term gives a time required for locating the start position of next data extents from the end position of the previous data extents.

The file length calculator 216 is configured to calculate a total length of the file on the tape medium 134 based on the physical length of each data extent. The expected time estimator 218 is configured to estimate an expected read time for reading the file by assuming that the file is rewritten continuously onto the tape medium or other tape medium, based on the calculated total length of the file. The fragmentation information provider 212 is configured to provide information about the fragmentation of the file based on the actual read time and the expected read time. In a particular embodiment, the fragmentation information provider 212 may provide information about the fragmentation of the file as an extended attribute of the file.

In a particular embodiment, the tape file system module 210 may provide an application programming interface (API) through which the information about the fragmentation of the file is provided as the attribute of the file. The information about the fragmentation of the file may be a fragmentation rate that indicates degree of the fragmentation of the file. The application 200 may request the fragmentation rate of the file specified by a filename.

The calculation of the expected read time and the provision of the information about the fragmentation of the file will be described more detail with referring to the series of FIGS. 6-11.

Figure 6:
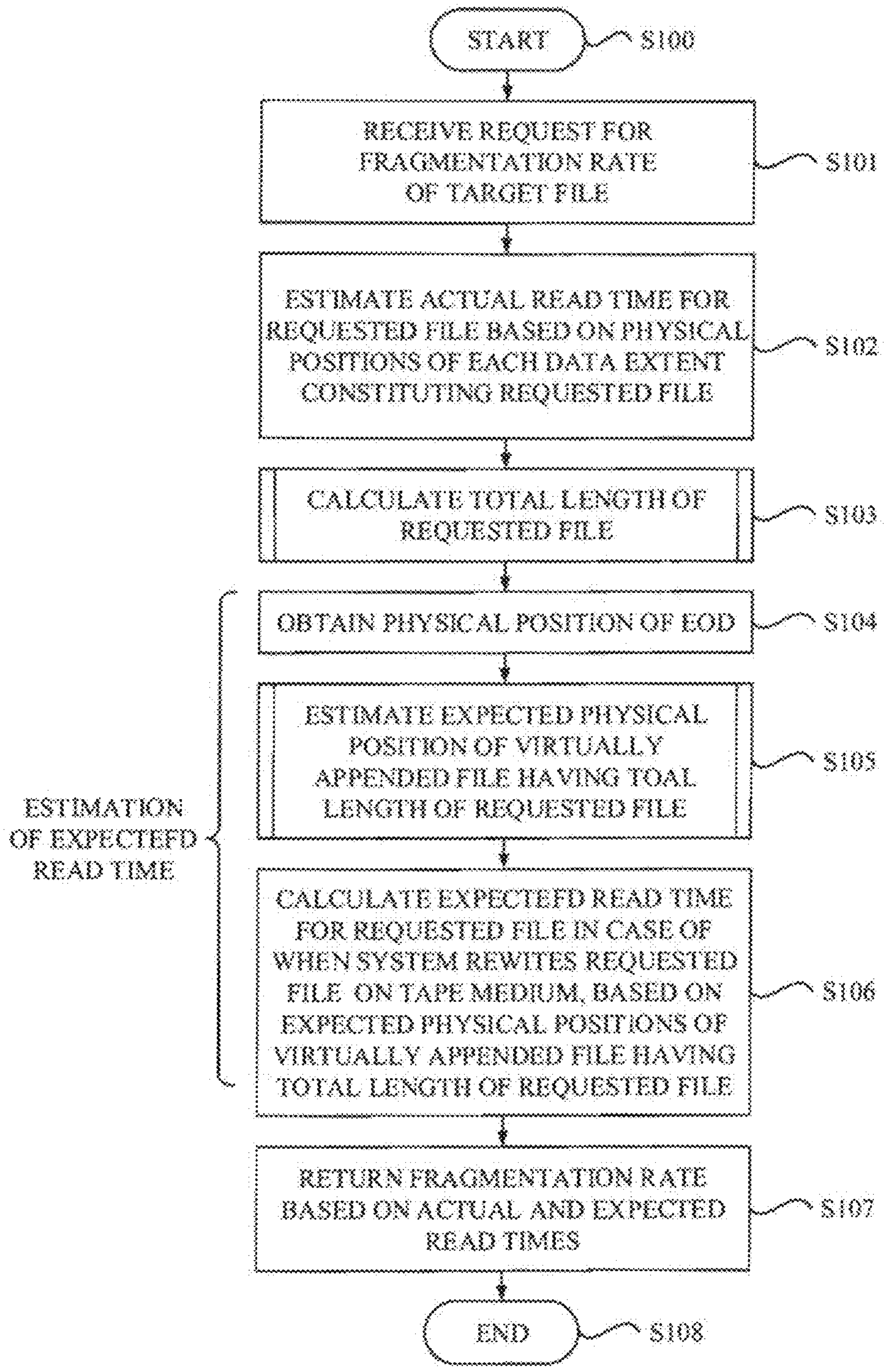
FIG. 6 is a flowchart depicting a process for providing information about fragmentation of a file according to the exemplary embodiment of the present invention.

Referring now to FIG. 6, a flowchart depicting a process for providing information about fragmentation of a file is shown. As shown in FIG. 6, process begins at step S100. Note that the process shown in FIG. 6 may be performed by the computer system 110 in response to a request for a fragmentation rate of a target file from the application 200 to the tape file system module 210.

At step S101, the computer system 110 receives the request for the fragmentation rate of the target file by the tape file system module 210. At step S102, the computer system 110 estimates the actual read time (actualReadTime) of the requested file based on the physical positions of the requested file, which may include the physical positions of each data extent constituting the requested file, by the actual time estimator 214.

At step S103, the computer system 110 calculates a total length of the requested file on the tape medium 134 based on the physical length of each data extent by the file length calculator 216.

Figure 7:
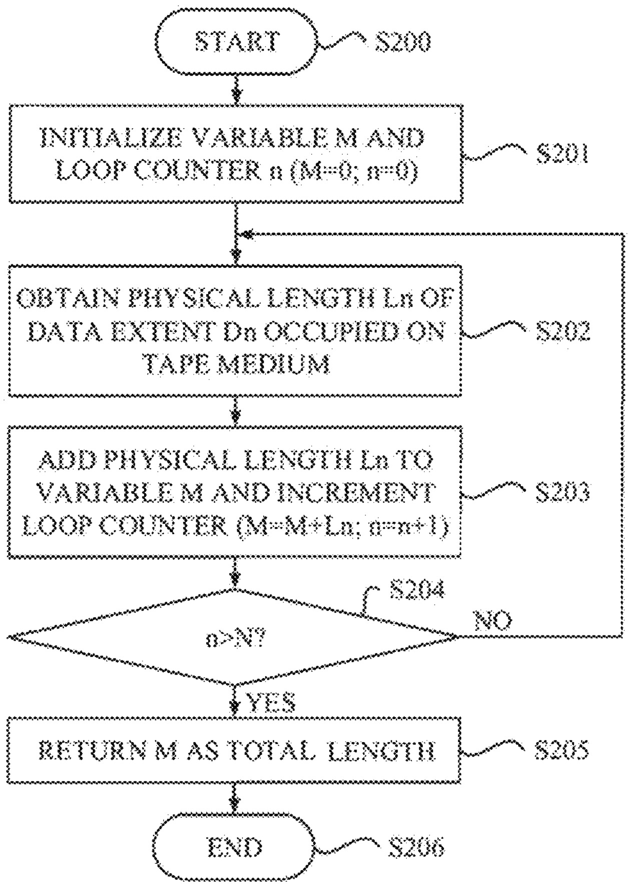
FIG. 7 is a flowchart depicting a process for calculating a total length of the file according to the exemplary embodiment of the present invention.

Referring to FIG. 7, a flowchart depicting a process for calculating the total length of the requested file is shown. As shown in FIG. 7, the process begins at step S200. Note that the process shown in FIG. 7 may be performed by the file length calculator 214 in response to performing the processing of step S103 shown in FIG. 6. At step S201, the computer system 110 initializes a variable M and a loop counter n (M=0, n=0). The variable M stores intermediate result of the total length of the requested file. The loop counter n identifies certain data extent among all data extents of the requested file.

Figure 8A:
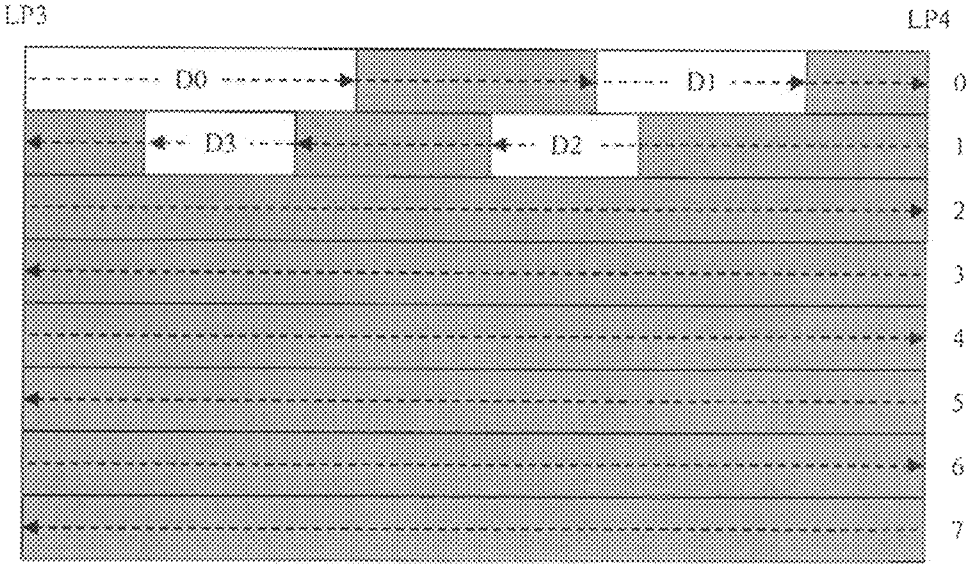
FIG. 8A depicts a plurality of data extents of the file over multiple wraps on the tape medium.

Referring to FIG. 8A, a plurality of data extents of the file over multiple wraps on the tape medium 134 is depicted. In this example, the requested file F includes four data extents, Dn (n=0, . . . , 3) and the loop counter n identifies a specific data extent Dn.

At step S202 of FIG. 7, the computer system 110 obtains the physical length Ln of the data extent Dn occupied on the tape medium 134. In a particular embodiment, the physical length Ln of the data extent Dn can be calculated by using the following equation:

$$\begin{aligned} Ln = {} & f(W_{En}, W_{Sn}) \times (W_{En} - W_{Sn} - 1) \times (lp4 - lp3) + \\ & g(W_{En}, W_{Sn}) \times (|L_{Sn} - l(W_{Sn})| + |L_{En} - l(W_{En} + 1)|) + \\ & (1 - g(W_{En}, W_{Sn})) \times |L_{En} - L_{Sn}| \end{aligned}$$

where $$f(W_{En}, W_{Sn}) = \begin{cases} 1 & \text{if } (W_{En} - W_{Sn}) > 1 \\ 0 & \text{else} \end{cases}$$

$$g(W_{En}, W_{Sn}) = \begin{cases} 0 & \text{if } (W_{En} = W_{Sn}) \\ 1 & \text{else} \end{cases}$$

$$l(W) = \begin{cases} lp3 & \text{if } (W = \text{odd wrap}) \\ lp4 & \text{else} \end{cases}$$

In the above mentioned equation for the physical length Ln, similarly to the equation for the actual read time (actualReadTime), the first term gives a length of data recorded from the beginning (LP3/LP4) to the end (LP4/LP3) of wraps fully occupied by the data. The second term gives a length of remaining data having a length of less than one wrap from the beginning or to the end of corresponding wraps. The third term gives a length of data extent from the start position to the end position if the data extent does not reside over the plurality of the wraps.

At step S203, the computer system 110 adds the obtained physical length Ln of the data extent Dn to the variable M so as to sum up the physical length Ln and increments the loop counter n to proceed to next data extent. At step S204, the computer system 110 determines whether the loop counter n exceeds the end of the extent number assigned to the last data extent N or not. If the computer system 110 determines that the loop counter n does not exceed N in step S204 (NO), then the process loops back to step S202 for next data extent. If the computer system 110 determines that the loop counter n exceeds N in step S204 (YES), then the process branches to step S205. At step S205, the computer system 110 returns the variable M as the total length of the requested file F and the process ends at step S206.

Figure 8B:
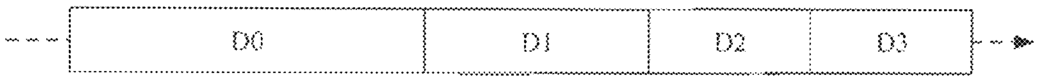
FIG. 8B depicts a virtual file having the total length of the file, which is virtually rearranged on a virtual single wrap having unlimited length.

Referring to FIG. 8B, a virtual file having the total length of the requested file, which is virtually rearranged on a virtual single wrap having unlimited length, is depicted. As shown in FIG. 8B, the total length is a length of the file virtually rearranged in a straight line by unfolding wraps of the file and closing spaces between the data extents of the file. The total length of the file can be stored as the attribute of the file in the index data 242.

In a describing embodiment, the calculation of the total length of the file may be done in response to receiving the request for the fragmentation rate of the file. However, in other embodiments, the calculation of the total length may be done in advance such as the time of writing the file and stored as the extended attribute of the file in the index data 242. Thus, at step S103 shown in FIG. 6, the computer system 110 can obtain the total length of the requested file by simply reading the extended attribute of the requested file stored in the index data 242.

Referring back to FIG. 6, at steps S104-S106, the computer system 110 estimates the expected read time for reading the file after locating the start position of the file by assuming that the file is rewritten continuously on the tape medium 134.

Specifically, at step S104, the computer system 110 obtains the physical position of the EOD of a target tape medium by the expected time estimator 218. Typically, the target tape medium may be the same as the tape medium to which the requested file recorded. However, in other embodiments, the target tape medium may be different from the tape medium recording the requested file. The physical position of the EOD can be obtained from the extended attribute of the root directory corresponding to the target tape medium. At step S105, the computer system 110 estimates an expected physical position of a virtually appended file having the total length of the requested file based on the total length and the physical position of the EOD by assuming that the virtual file having the total length M is arranged after the EOD on the target tape medium 134.

Figure 9:
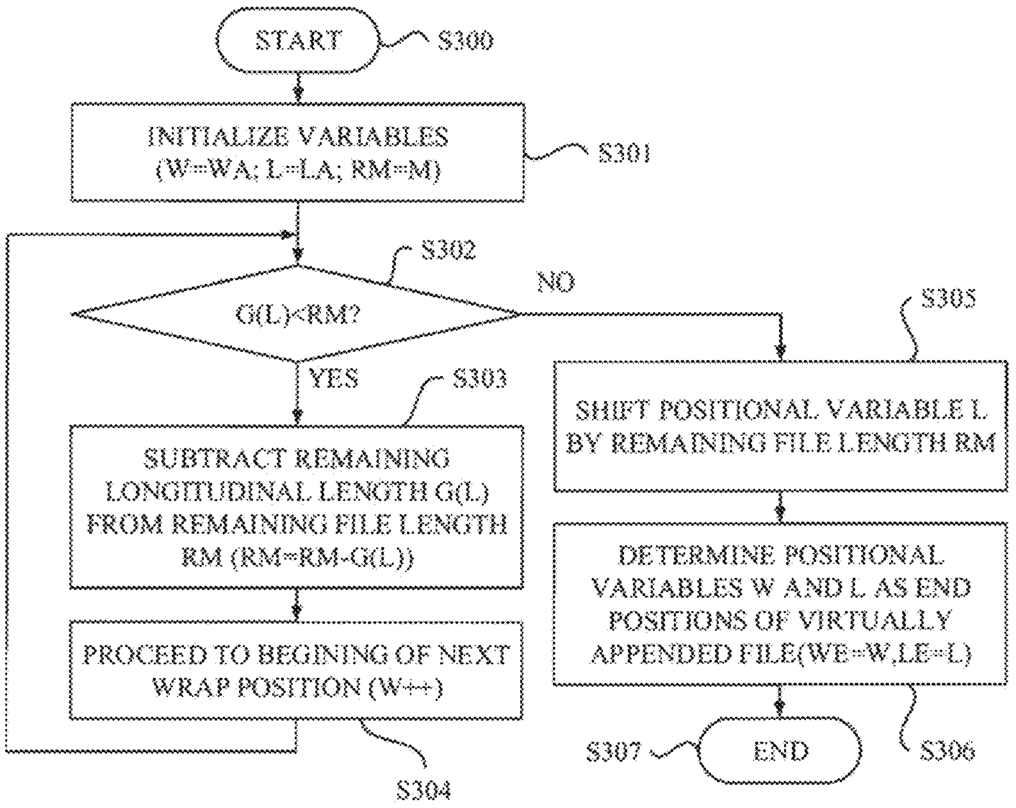
FIG. 9 is a flowchart depicting a process for estimating expected physical positions of the virtual file having the total length of the file according to the exemplary embodiment of the present invention.

Referring to FIG. 9, a flowchart depicting a process for estimating the expected physical position of the virtual file having the total length of the requested file after the EOD is shown. As shown in FIG. 9, the process begins at step S300 in response to performing the processing of step S105 shown in FIG. 6.

At step S301, the computer system 110 initializes variables (W=WA; L=LA; RM=M). The positional variables W and L store current wrap and longitudinal positions in order to estimate an end position of the virtual file, respectively. WA and LA denote the wrap and longitudinal positions of the EOD, respectively. The variable RM stores currently remaining file length of the virtual file, which has not been assigned to the recording space on the tape medium 134 yet. Hence, the obtained physical positions of the EOD (WA, LA) are set as initial longitudinal and wrap positions and the calculated total length of the requested file, M, is set as initial remaining file length at step S301.

At step S302, the computer system 110 calculates a remaining longitudinal length G(L) for the current wrap position W and determines whether the current remaining file length RM exceeds the remaining longitudinal length G(L) or not. The remaining longitudinal length G(L) is a length from the current longitudinal position L to a longitudinal end (LP3/LP4) at the current wrap position W and can be expressed by the following equation:

$$G(L) = \begin{cases} |lp3 - L| & \text{for odd wraps} \\ |lp4 - L| & \text{for even wraps} \end{cases}$$

If the computer system 110 determines that the current remaining file length RM exceeds the remaining longitudinal length G(L) in step S302 (YES), then the process proceeds to step S303. At step S303, the computer system 110 subtracts the remaining longitudinal length G(L) from the current remaining file length RM. At step S304, the computer system 110 proceeds to the current longitudinal and wrap positions W and L to a beginning of next wrap position and the process loops back to step S302. The beginning of the next wrap position can be obtained by the following equations:

$$W = W + 1$$

$$L = \begin{cases} lp4 & \text{if } (W = \text{odd wrap}) \\ lp3 & \text{else} \end{cases}$$

If the computer system 110 determines that the current remaining file length RM does not exceed the remaining longitudinal length G(L) in step S302 (NO), then the process proceeds to step S305. At step S305, the computer system 110 shifts or proceeds the current longitudinal position L by the current remaining file length RM. The current longitudinal position L can be updated by using the following equation:

$$L = \begin{cases} L - RM & \text{if } (W = \text{odd wrap}) \\ L + RM & \text{else} \end{cases}$$

At step S306, the computer system 110 determines the current longitudinal position L and the current wrap positions W, as the end position of the virtually appended file having the virtual length of the requested file and the process ends at step S307. Thus, the start position and end position of the virtual file having the total length of the requested file are obtained as the expected physical position of the virtual file.

Figure 10:
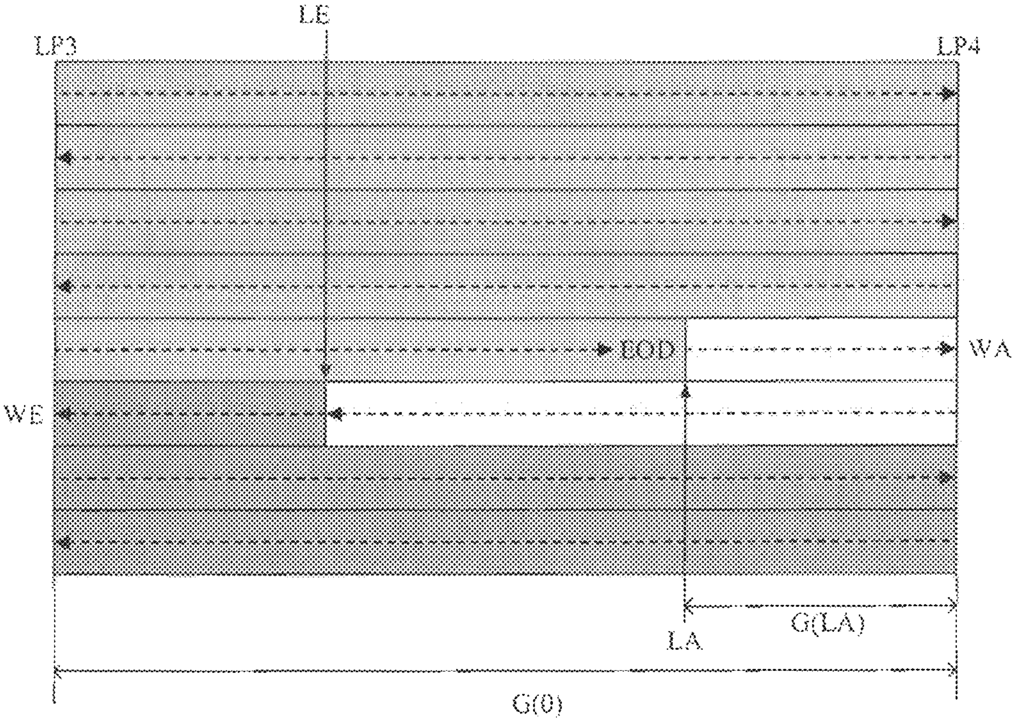
FIG. 10 depicts the virtual file arranged after the EOD on the tape medium.

Referring to FIG. 10, the virtual file arranged after the EOD on the tape medium is shown. The recording region for the virtual file can be defined by the start position represented by WA and LA and the end position represented by WE and LE.

Referring back to FIG. 6, at step S106, the computer system 110 calculates the expected read time for the requested file in the case when the requested file is rewritten on the target tape medium, based on the expected physical position of the virtual file (WA, LA, WE, LE). In a particular embodiment, the expected read time (expectedReadTime) for the requested file can be calculated using the following equation:

$$\begin{aligned} expectedReadTime = &\sum_{W=WA}^{WE-1} T_{WC}(W \to W+1) + \\ &f(WE, WA) \times (WE - WA - 1) \times (lp4 - lp3)/S_R + \\ &g(WE, WA) \times (|LA - l(WA)| + |LE - l(WE+1)|)/S_R + \\ &(1 - g(WE, WA)) \times |LE - LA|/S_R \end{aligned}$$

where $S_L$: SPEED TO LOCATE $(LOPS/s)$ $S_R$: SPEED TO READ $(LOPS/s)$ $T_{WC}(W_p \to W_q)$: TIME FOR WRAP CHANGE FROM $W_p$ TO $W_q$ $$f(WE, WA) = \begin{cases} 1 & \text{if } (WE - WA) > 1 \\ 0 & \text{else} \end{cases}$$

$$g(WE, WA) = \begin{cases} 0 & \text{if } (WE = WA) \\ 1 & \text{else} \end{cases}$$

$$l(W) = \begin{cases} lp3 & \text{if } (W = \text{odd wrap}) \\ lp4 & \text{else} \end{cases}$$

In above mentioned equation, meaning of first to fourth terms is similar to that of the equation for the actual read time. In contrast, since the virtual file may include merely single data extent, summation over the data extents is omitted.

At step S107, the computer system 110 returns the fragmentation rate of the requested file based on the actual and expected read times by the fragmentation information provider 220 and the process ends at step S108. The fragmentation rate of the file F can be defined by the following equation:

$$fragmantationRate(F) = \frac{expectedReadTime(F)}{actualReadTime(F)}$$

The fragmentation rate (fragmentionRate) denotes how the reading speed is improved by rewriting the file. The value is close to zero as the expected reading speed becomes faster.

In a particular embodiment, user can obtain the fragmentation rate as the attribute of the file. The tape file system module 210 can return a value by calculating the fragmentation rate of the requested file for the target tape medium in response to receiving a request from users. Since the fragmentation rate may dynamically vary depending on a position of EOD on the tape medium, the tape file system module 210 may recalculate the value for each request. Also, the tape file system module 210 may store the calculated value of the fragmentation rate of the requested file into the index data 242 in the cache 240, and subsequently the calculated value is stored into the index data in the tape medium 134. Referring to FIG. 11, data structure of index data for a file in the tape medium 134, which includes information about fragmentation of the file on the tape medium, is shown. In FIG. 11, the part expressed in underline is an extended attribute representing the fragmentation rate.

Thus, it can assist users to select an appropriate file whose read performance is expected to be improved by rewriting. For example, the users can obtain fragmentation rates of the files on the tape medium 134 and rewrite the file having the smallest fragmentation rate preferably.

Also the users can confirm the fragmentation rate of files found to be a suspected file whose reading time is longer than those expected, and rewrite the suspected file if it has a relatively higher fragmentation rate. Thus, in accordance with the novel file information provision function according to the embodiments described hereinabove, a time and workload required for eliminating the fragmentations of the files can be reduced significantly. The tape medium can be utilized efficiently by avoiding unnecessary rewrites that is of little help for improving read performance.

Regarding a remaining capacity of the tape medium, the file may not be accommodated in the tape medium anymore. In such cases, the computer system 110 can notify that the file is not able to be rewritten onto current tape medium by setting the expected read time to be zero so that the fragmentation rate shows a zero value when the total length of the requested file exceeds the remaining capacity of the tape medium. Alternatively, the computer system 110 can notify that the read performance of the file is expected to be improved if the file is rewritten onto other tape medium by multiplying the expected read time by −1 so that the fragmentation rate takes a negative value, when the total length of the requested file exceeds the remaining capacity. In this manner, the users can distinguish a file whose reading speed is expected to be improved when rewriting onto another tape medium.

In a particular embodiment, the users can utilize the novel file information provision function according to one or more embodiments of the present invention so as to create a batch program, by which the computer system 110 is configured to obtain the fragmentation rate of each file in a plurality of files (which may be all files on the tape medium or certain files in specific directory, for example), detect a fragmented file from among the plurality of the files based on the fragmentation rate of each file, and rewrite the fragmented file onto the tape medium or tape medium. By repeatedly performing this batch program, the plurality of the fragmented file can be rewritten. Also the users can utilize the novel file information provision function so as to create another batch program, by which the computer system 110 is configured to create a schedule for rewriting a plurality of fragmented files to a specific target tape medium by assuming the obtained expected end position of the virtually rewritten file as a new EOD for next file in a one by one manner.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing information about fragmentation of a file on a sequential access medium by a computer system, the method comprising:

estimating an actual time for reading the file recorded on the sequential access medium based on a physical position of the file;

calculating a total length of the file on the sequential access medium based on a physical length of each data piece constituting the file;

estimating an expected time for reading the file by assuming that the file is rewritten continuously, based on the total length of the file, wherein the estimating the expected time comprises:

obtaining a physical position of EOD (end of data) on a target sequential access medium, the target sequential access medium being a same as or different from the sequential access medium to which the file recorded;

estimating an expected physical position of virtual data having, the total length of the file by assuming that the virtual data is arranged after the EOD on the target sequential access medium based on the total length and the physical position of the EOD; and calculating the expected time based on the expected physical position of the virtual data having the total length of the file; and providing information about the fragmentation of the file based on the actual time and the expected time.

2. The method of claim 1, wherein the estimating of the expected physical position of the virtual data comprises:

setting the physical position of the EOD as current longitudinal and wrap positions;

calculating a remaining longitudinal length from the current longitudinal position to a longitudinal end at the current wrap position;

subtracting the remaining longitudinal length from remaining total length and proceeding the current longitudinal and wrap positions to a beginning of a next wrap position if the remaining total length exceeds the remaining longitudinal length;

shifting the current longitudinal position by the remaining total length if the remaining total length does not exceed the remaining longitudinal length; and determining the current longitudinal and wrap positions as the expected physical position.

3. The method of claim 1, wherein the calculating of the total length comprises:

obtaining the physical length of each data piece constituting the file; and summing up the physical length of each data pieces constituting the file.

4. The method of claim 1, wherein the information about the fragmentation of the file is provided as an attribute of the file through an application programming interface.

5. The method of claim 1, wherein the physical position of the file includes a longitudinal position and a wrap position of start and end positions of each data piece constituting the file, the longitudinal position and the wrap position being obtained as an attribute of the file from index data of the sequential access medium.

6. The method of claim 1, wherein the method further comprises:

notifying that the file is not able to be rewritten onto the sequential access medium or read performance of the file is expected to be improved if the file is rewritten onto other sequential access medium, in response to determining that the total length of the file exceeds a remaining capacity of the sequential access medium.

7. The method of claim 1, wherein the method further comprises:

obtaining the information about the fragmentation of each file among a plurality of files;

detecting a fragmented file from among the plurality of the files based on the information about the fragmentation of each file; and rewriting the fragmented file onto the sequential access medium or other sequential access medium.

8. The method of claim 1, wherein the sequential access medium is a tape medium.

9. A computer system for providing information about fragmentation of a file on a sequential access medium, the computer system comprising:

a processor; and a memory coupled to the processor, wherein the memory comprises instructions which, when executed by the processor, cause the processor to:

estimate an actual time for reading the file recorded on the sequential access medium based on a physical position of the file;

calculate a total length of the file on the sequential access medium based on a physical length of each data piece constituting the file;

estimate an expected time for reading the file by assuming that the file is rewritten continuously, based on the total length of the file, wherein the instructions to estimate the expected time further cause the processor to:

obtain a physical position of EOD (end of data) on a target sequential access medium, the target sequential access medium being a same as or different from the sequential access medium to which the file recorded;

estimate an expected physical position of virtual data having the total length of the file by assuming that the virtual data is arranged after the EOD on the target sequential access medium based on the total length and the physical position of the EOD; and calculate the expected time based on the expected physical position of the virtual data having the total length of the file; and provide information about the fragmentation of the file based on the actual time and the expected time.

10. The computer system of claim 9, wherein the instructions to estimate the expected physical position of the virtual data further cause the processor to:

set the physical position of the EOD as current longitudinal and wrap positions;

calculate a remaining longitudinal length from the current longitudinal position to a longitudinal end at the current wrap position;

subtract the remaining longitudinal length from remaining total length and proceeding the current longitudinal and wrap positions to a beginning of a next wrap position if the remaining total length exceeds the remaining longitudinal length;

shift the current longitudinal position by the remaining total length if the remaining total length does not exceed the remaining longitudinal length; and determine the current longitudinal and wrap positions as the expected physical position.

11. The computer system of claim 9, wherein the instructions to calculate the total length further cause the processor to:

obtain the physical length of each data piece constituting the file; and sum up the physical length of each data pieces constituting the file.

12. The computer system of claim 9, wherein the file information provider is further configured to provide the information about the fragmentation of the file as an attribute of the file through an application programming interface.

13. The computer system of claim 9, wherein the instructions further cause the processor to:

notify that the file is not able to be rewritten onto the sequential access medium or read performance of the file is expected to be improved if the file is rewritten onto other sequential access medium, in response to determining that the total length of the file exceeds a remaining capacity of the sequential access medium.

14. The computer system of claim 9, wherein the instructions further cause the processor to:

obtain the information about the fragmentation of each file among a plurality of files;

detect a fragmented file from among the plurality of the files based on the information about the fragmentation of each file; and rewrite the fragmented file onto the sequential access medium or other sequential access medium.

15. A computer program product for providing information about fragmentation of a file on a sequential access medium, the computer program product comprising a computer readable storage medium having a computer readable program stored therein, wherein the computer readable program, when executed on a computing device, causes the computing device to:

estimate an actual time for reading the file recorded on the sequential access medium based on a physical position of the file;

calculate a total length of the file on the sequential access medium based on a physical length of each data piece constituting the file;

estimate an expected time for reading the file by assuming that the file is rewritten continuously, based on the total length of the file, wherein the computer readable program to estimate the expected time further causes the computing device to:

obtain a physical position of EOD (end of data) on a target sequential access medium, the target sequential access medium being a same as or different from the sequential access medium to which the file recorded;

estimate an expected physical position of virtual data having the total length of the file by assuming that the virtual data is arranged after the EOD on the target sequential access medium based on the total length and the physical position of the EOD; and calculate the expected time based on the expected physical position of the virtual data having the total length of the file; and provide information about the fragmentation of the file based on the actual time and the expected time.

16. The computer program product of claim 15, wherein the computer readable program to estimate the expected physical position of the virtual data further causes the computing device to:

set the physical position of the EOD as current longitudinal and wrap positions;

calculate a remaining longitudinal length from the current longitudinal position to a longitudinal end at the current wrap position;

subtract the remaining longitudinal length from remaining total length and proceeding the current longitudinal and wrap positions to a beginning of a next wrap position if the remaining total length exceeds the remaining longitudinal length;

shift the current longitudinal position by the remaining total length if the remaining total length does not exceed the remaining longitudinal length; and determine the current longitudinal and wrap positions as the expected physical position.

17. The computer program product of claim 15, wherein the computer readable program to calculate the total length further causes the computing device to:

obtain the physical length of each data piece constituting the file; and sum up the physical length of each data pieces constituting the file.

18. The computer program product of claim 15, wherein the computer readable program further causes the computing device to:

notify that the file is not able to be rewritten onto the sequential access medium or read performance of the file is expected to be improved if the file is be rewritten onto other sequential access medium, in response to determining that the total length exceeds a remaining capacity of the sequential access medium.

19. The computer program product of claim 15, wherein the file information provider is further configured to provide the information about the fragmentation of the file as an attribute of the file through an application programming interface.

20. The computer program product of claim 15, wherein the computer readable program further causes the computing device to:

obtain the information about the fragmentation of each file among a plurality of files;

detect a fragmented file from among the plurality of the files based on the information about the fragmentation of each file; and rewrite the fragmented file onto the sequential access medium or other sequential access medium.

* * * * *